United States Patent
Jalilevand et al.

(10) Patent No.: US 10,644,367 B2
(45) Date of Patent: May 5, 2020

(54) ELECTRIC VEHICLE BATTERY COOLING USING EXCESS CABIN AIR CONDITIONING CAPACITY

(71) Applicant: FORD GLOBAL TECHNOLOGIES, LLC, Dearborn, MI (US)

(72) Inventors: Ali Jalilevand, Ann Arbor, MI (US); Manfred Koberstein, Troy, MI (US); Kenneth J. Jackson, Dearborn, MI (US); Michael Steven Wallis, Belleville, MI (US); William Stewart Johnston, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 603 days.

(21) Appl. No.: 15/285,067

(22) Filed: Oct. 4, 2016

(65) Prior Publication Data
US 2018/0097266 A1     Apr. 5, 2018

(51) Int. Cl.
*H01M 10/633* (2014.01)
*B60L 1/02* (2006.01)
(Continued)

(52) U.S. Cl.
CPC ...... *H01M 10/633* (2015.04); *B60H 1/00278* (2013.01); *B60H 1/00392* (2013.01);
(Continued)

(58) Field of Classification Search
CPC ............. H01M 10/613; H01M 10/625; H01M 10/663; H01M 10/522; H01M 10/486; H01M 2220/20; B60L 1/02; B60L 1/1874; B60L 2240/34; B60L 2240/545; B60L 1/224; B60L 1/34; B60L 1/545; B60H 1/00278; B60H 1/00392; B60H 1/3205; B60H 1/3211; B60H 1/323; B60H 2001/00307; B60H 2001/3255; B60H 2001/3263; B60H 2001/327;
(Continued)

(56) References Cited

U.S. PATENT DOCUMENTS 5,301,515 A * 4/1994 Iritani ................ B60H 1/00392
                                                                454/121
7,890,218 B2    2/2011 Adams et al.
(Continued)

FOREIGN PATENT DOCUMENTS

CN        200974474 Y        11/2007

OTHER PUBLICATIONS

English Machine Translation of CN200974474Y.

*Primary Examiner* — Anthony R Jimenez
(74) *Attorney, Agent, or Firm* — David Coppiellie; King & Schickli, PLLC

(57) ABSTRACT

A battery thermal management system includes a passenger cabin air-conditioning refrigerant loop including at least one evaporator in fluid communication with a chiller and a battery pack coolant loop in fluid communication with the chiller. A controller is configured to determine whether a temperature of the at least one evaporator falls within a predetermined temperature range, and if so to cause a valve to bypass a refrigerant from the air-conditioning refrigerant loop to the chiller. Evaporator temperature is determined by providing at least one evaporator temperature sensor.

17 Claims, 3 Drawing Sheets

Figure 1:
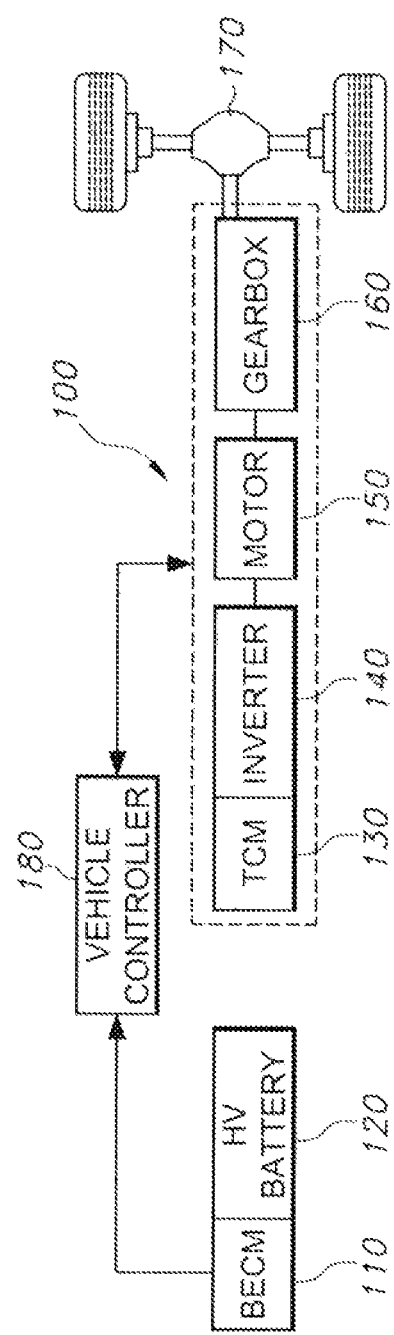

(51) Int. Cl.
*B60H 1/32* (2006.01)
*B60L 58/26* (2019.01)
*H01M 10/613* (2014.01)
*H01M 10/625* (2014.01)
*H01M 10/663* (2014.01)
*B60H 1/00* (2006.01)
*H01M 10/48* (2006.01)

(52) U.S. Cl.
CPC .......... *B60H 1/323* (2013.01); *B60H 1/3205* (2013.01); *B60H 1/3211* (2013.01); *B60L 1/02* (2013.01); *B60L 58/26* (2019.02); *H01M 10/486* (2013.01); *H01M 10/613* (2015.04); *H01M 10/625* (2015.04); *H01M 10/663* (2015.04); *B60H 2001/00307* (2013.01); *B60H 2001/327* (2013.01); *B60H 2001/3255* (2013.01); *B60H 2001/3263* (2013.01); *B60L 2240/34* (2013.01); *B60L 2240/545* (2013.01); *H01M 2220/20* (2013.01); *Y02T 10/7005* (2013.01); *Y02T 10/705* (2013.01); *Y02T 90/16* (2013.01)

(58) Field of Classification Search
CPC .............. B60H 1/2001; B60H 1/00307; B60H 1/3255; B60H 1/3263; B60H 1/327; Y02T 10/7005; Y02T 10/705; Y02T 90/16; G06T 5/002; G06T 2207/10032; G06T 2207/10016; G06T 2207/20012; G06T 2207/30232; G06T 2207/30244; B64C 39/024; B64C 2201/127; B64D 47/08; G01C 21/00; G06K 9/00201; G06K 2209/27
See application file for complete search history.

(56) References Cited

U.S. PATENT DOCUMENTS

| | | | |
|---|---|---|---|
| 8,448,460 | B2 | 5/2013 | Dogariu et al. |
| 2009/0133859 | A1 | 5/2009 | Suzuki et al. |
| 2009/0176150 | A1 | 7/2009 | Yanaka |
| 2009/0249807 | A1* | 10/2009 | Nemesh ............. B60H 1/00278 62/117 |
| 2012/0297809 | A1* | 11/2012 | Carpenter ............... B60L 1/003 62/244 |
| 2013/0298586 | A1 | 11/2013 | Hwang et al. |
| 2015/0202986 | A1* | 7/2015 | Hatakeyama ............ B60H 1/22 165/287 |
| 2016/0159204 | A1* | 6/2016 | Katoh ................. B60H 1/3211 62/185 |

* cited by examiner

ELECTRIC VEHICLE BATTERY COOLING USING EXCESS CABIN AIR CONDITIONING CAPACITY

TECHNICAL FIELD

This document relates generally to the motor vehicle field and, more particularly, to an electric vehicle battery cooling system and related method.

BACKGROUND

Vehicles are being developed that reduce or completely eliminate reliance on internal combustion engines, with a goal of reducing or eliminating automotive fuel consumption and emissions. Electrified vehicles are one type of vehicle currently being developed for this purpose. In general, electric vehicles differ from conventional motor vehicles because they are selectively driven by one or more battery powered electric machines. Conventional motor vehicles, by contrast, rely exclusively on the internal combustion engine to drive the vehicle.

A high voltage battery pack typically partially or fully powers the electric machines and other electrical loads of the electric vehicle. The battery pack includes a plurality of battery cells that must be periodically recharged to replenish the energy necessary to power these loads. As is known, during operations such as charging and discharging the battery cells generate heat which must be managed. Thus, there is a need for innovative battery thermal management systems to manage the heat generated by the battery cells.

To address these and other issues, the present disclosure describes an electric vehicle cooling system utilizing excess cooling capacity generated by the vehicle air conditioning (A/C) system, and describes also a related method for battery thermal management in an electric vehicle.

SUMMARY

In accordance with the purposes and benefits described herein, a battery thermal management system is provided comprising a passenger cabin air-conditioning refrigerant loop comprising at least one evaporator in fluid communication with a chiller, a battery pack coolant loop in fluid communication with the chiller, and a controller configured to determine whether a temperature of the at least one evaporator falls within a predetermined temperature range, and if so to cause a valve to bypass a refrigerant from the air-conditioning refrigerant loop to the chiller. The controller is further configured to cause the valve to bypass the air-conditioning refrigerant loop refrigerant to the chiller only on determining that the battery pack temperature has reached or exceeded a predetermined upper temperature limit.

At least one evaporator temperature sensor is provided to monitor a temperature of the at least one evaporator. In embodiments, the valve is a thermal expansion valve (TXV) which controls introduction of the refrigerant into the chiller. At least one battery pack temperature sensor may be provided to monitor a temperature of the battery pack. The passenger cabin air-conditioning refrigerant loop may further comprise a compressor. In embodiments, the controller is further configured to prevent the compressor from operating above a predetermined maximum operating pressure.

In another aspect, a method for battery pack thermal management is described, comprising configuring a controller to determine whether a temperature of at least one evaporator of a passenger cabin air-conditioning refrigerant loop falls within a predetermined temperature range, further wherein if so the controller is configured to cause a valve to introduce a refrigerant from the passenger cabin air-conditioning refrigerant loop into a chiller in fluid communication with both the passenger cabin air-conditioning refrigerant loop and a battery pack coolant loop.

In embodiments, the method includes determining a temperature of the at least one evaporator by at least one evaporator temperature sensor. The method may also include providing a thermal expansion valve (TXV) to control introduction of the refrigerant into the chiller.

Still further, the method may include configuring the controller to determine whether a battery pack temperature has exceeded a predetermined upper limit. This may be accomplished by providing at least one battery pack temperature sensor. In embodiments, the method includes configuring the controller to cause the valve to introduce the air-conditioning refrigerant loop refrigerant to the chiller only on determining that the battery pack temperature has reached or exceeded the predetermined upper limit. In embodiments, the method further includes providing the passenger cabin air-conditioning refrigerant loop including a compressor, and further configuring the controller to prevent the compressor from operating above a predetermined maximum operating pressure.

In the following description, there are shown and described several preferred embodiments of the electric vehicle battery cooling system and method. As it should be realized, the battery cooling system and method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

Figure 2:
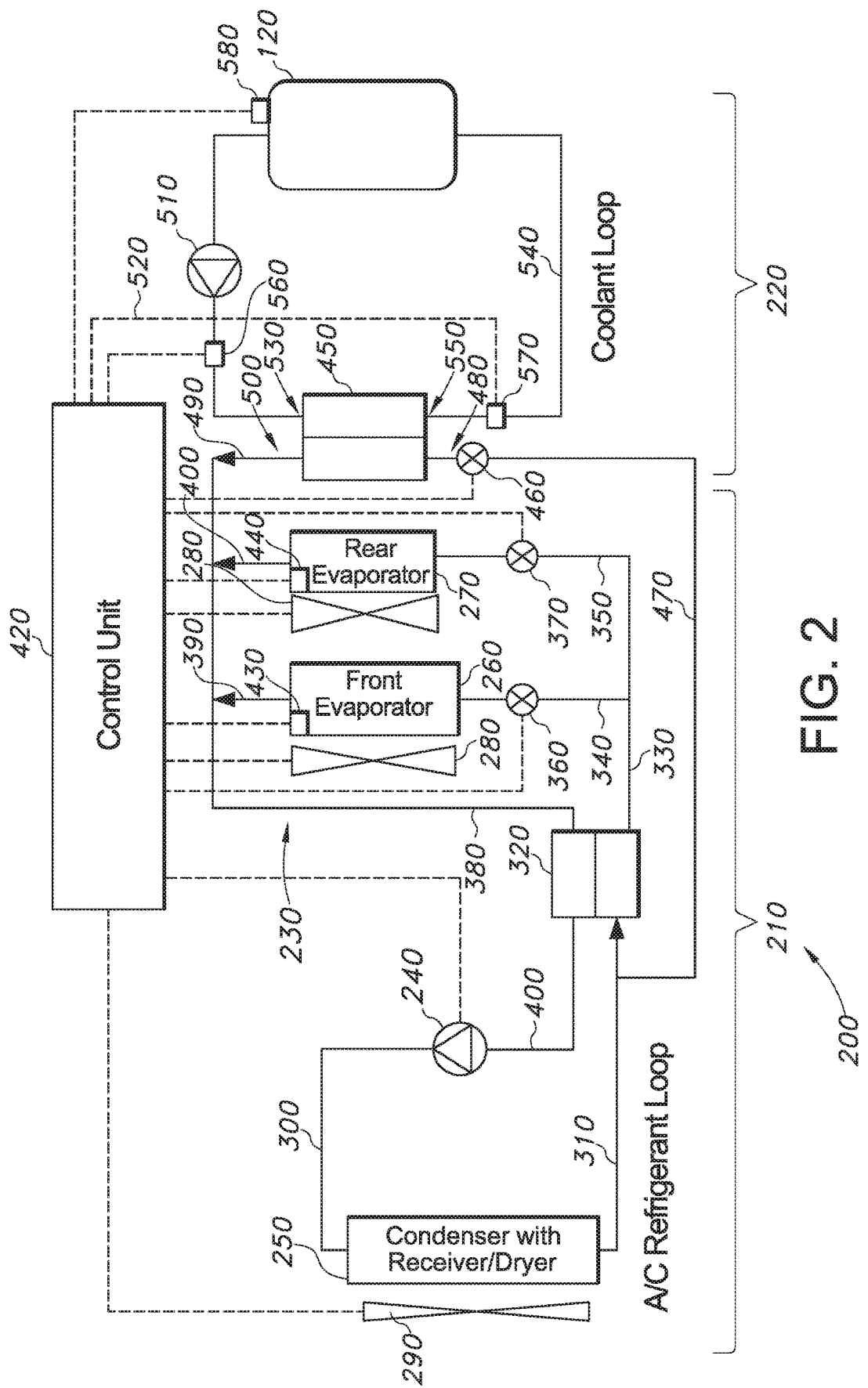
Figure 3:
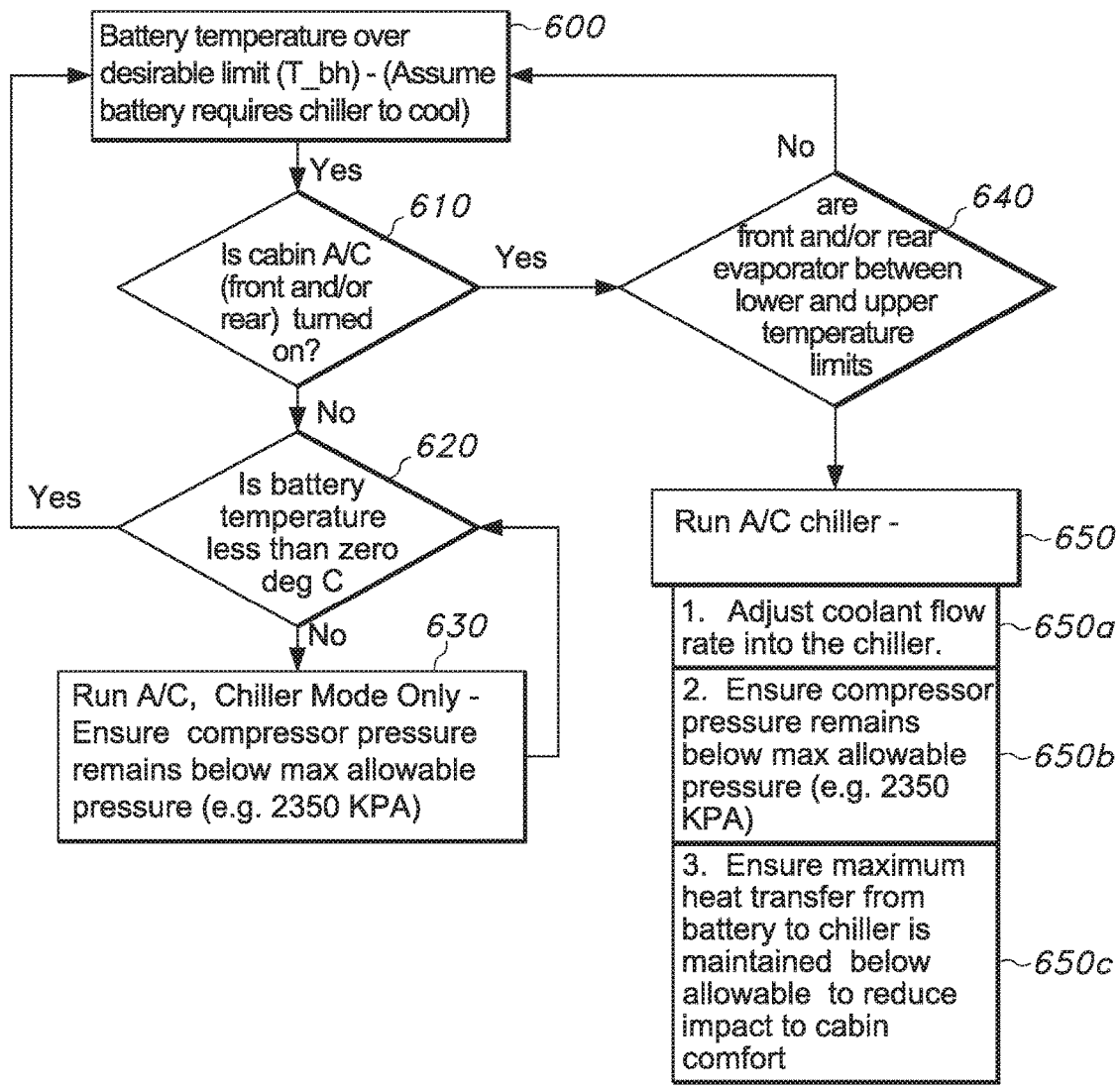

The accompanying drawing figures incorporated herein and forming a part of the specification, illustrate several aspects of the battery cooling system and method and together with the description serve to explain certain principles thereof. In the drawing figures:

FIG. 1 schematically illustrates an electric vehicle;

FIG. 2 schematically illustrates a battery cooling system according to the present disclosure; and FIG. 3 depicts a representative logic for a battery cooling operating strategy for the electric vehicle of FIG. 1.

Reference will now be made in detail to the present preferred embodiments of the described battery cooling system and method, examples of which are illustrated in the accompanying drawing figures.

DETAILED DESCRIPTION

Reference is now made to FIG. 1 which schematically illustrates an electric or hybrid vehicle 100 of substantially conventional design. Preliminarily, while the present descriptions and drawings primarily describe the disclosed electric vehicle heating distribution system and method in the context of a battery electric or hybrid vehicle, it will readily be appreciated by the skilled artisan that the disclosed subject matter is readily adaptable to any electric vehicle. At a high level, the term "electric vehicle" as used herein encompasses battery electric vehicles (BEV), hybrid electric vehicles (HEV), plug-in hybrid electric vehicles (PHEV), fuel cell vehicles, or any vehicle having an electric vehicle range. Indeed, the claimed subject matter is applicable to any vehicle, electric or otherwise, utilizing in combination an A/C refrigerant loop for passenger cabin climate control and a battery pack coolant loop for battery pack thermal management. Thus, the disclosures should not be taken as limiting.

As background, a BEV includes an electric motor, wherein the energy source for the motor is a traction battery. The BEV traction battery is re-chargeable from an external electric grid. The BEV traction battery is in effect the sole source of on-board energy for vehicle propulsion. A HEV includes an internal combustion engine and an electric motor, wherein the energy source for the engine is fuel and the energy source for the motor is a traction battery. The engine is the main source of energy for vehicle propulsion with the HEV traction battery providing supplemental energy for vehicle propulsion (the HEV traction battery buffers fuel energy and recovers kinematic energy in electric form). A PHEV differs from a HEV in that the PHEV traction battery has a larger capacity than the HEV traction battery and the PHEV traction battery is re-chargeable from the grid. The PHEV traction battery is the main source of energy for vehicle propulsion until the PHEV traction battery depletes to a low energy level at which time the PHEV operates like a HEV for vehicle propulsion.

Returning to FIG. 1, the described electric vehicle 100 includes a battery electric control module 110, a battery pack 120 (in the depicted embodiment a high voltage electric battery), and a transmission control module (TCM) 130 associated with a power inverter 140. The electric vehicle 100 further includes an electric motor 150 which supplies drive power to a gearbox 160, which in turn supplies a drive force to the vehicle axle/ground engaging tires 170. A vehicle controller 180 may monitor/control various interactions and functions of the above-described systems.

Referring now to FIG. 2, the vehicle 100 includes a climate control system 200 including at least a passenger cabin air-conditioning (A/C) subsystem 210 and a battery coolant subsystem 220. Portions of the various thermal-management systems may be located within various areas of the vehicle, such as the engine compartment and the cabin, for example. As will be described, the passenger cabin air-conditioning (A/C) subsystem 210 provides air conditioning of the passenger cabin during some operating modes, and also may cool the battery pack 120 during some operating modes.

The passenger cabin air-conditioning (A/C) subsystem 210 may be a vapor-compression heat pump that circulates a refrigerant transferring thermal energy to various components of the climate control system 200. The passenger cabin air-conditioning subsystem 210 may include a passenger cabin refrigerant loop 230 having a compressor 240, an exterior heat exchanger 250 (e.g., condenser), a first interior heat exchanger (e.g., front evaporator 260), a second interior heat exchanger (e.g., rear evaporator 270), an accumulator, fittings, valves, expansion devices and other components commonly associated with refrigerant subsystems. The evaporators may each have an associated blower 280. The condenser 250 may be located behind the grille near the front of the vehicle, and the front and rear evaporators 260, 270 may be disposed within one or more HVAC housings. It is to be understood that heat exchangers labeled as "condenser" may also act as an evaporator if the passenger cabin air-conditioning (A/C) subsystem 210 is a heat pump. A fan 290 may circulate air over the condenser 250.

The passenger cabin refrigerant loop 230 components are connected in a closed loop by a plurality of conduits, tubes, hoses or lines. For example, a first conduit 300 places the compressor 240 and the condenser 250 in fluid communication, a second conduit 310 connects the condenser 250 to an intermediate heat exchanger 320, and another conduit 330 places the evaporators 260, 270 in fluid communication with the intermediate heat exchanger 320. The front evaporator 260 is connected with conduit 330 via conduit 340, and the rear evaporator 270 is connected with conduit 330 via conduit 350. A first expansion device 360 is disposed on conduit 340 and controls refrigerant flow to the front evaporator 260. The expansion device is configured to change the pressure and temperature of the refrigerant in the subsystem 210. The expansion device 360 may be a thermal expansion valve with an electronically controllable shut-off feature or may be an electronic expansion valve. A second expansion device 370 is disposed on conduit 350 and controls refrigerant flow to the rear evaporator 270. The second expansion device 370 may be similar to or different from the first expansion device 360. The front evaporator 260 is connected to a return conduit 380 via conduit 390, and the rear evaporator 270 is connected with return conduit 380 via conduit 400. The return conduit 380 connects between the intermediate heat exchanger 320 and the evaporators 260, 270. Conduit 410 connects between the intermediate heat exchanger 320 and the compressor 240. The intermediate heat exchanger 320 is optional.

The climate control system 200 includes a controller 420 in electronic communication with several of the climate-control components. The controller 420 may be the same or may be different from the vehicle controller 180.

The dashed lines in FIG. 2 illustrate electrical connections between the controller 420 and the components. The controller may interface with the various components via a data bus or dedicated wires as described above. The evaporators 260, 270 each include a respective temperature sensor 430 and 440 configured to send a signal indicating the temperature of the corresponding evaporator to the controller 420. Using these temperature signals, and other signals, the controller 420 can determine the operating conditions of the various components of the climate control system 200.

The battery coolant subsystem 220 includes a chiller 450 which, as will be described below can be placed in fluid communication with the passenger cabin refrigerant loop 230, and a third expansion device 460. The battery coolant subsystem 220 may include a supply conduit 470 connected to conduit 310 by a fitting and connected to a refrigerant-inlet side 480 of the chiller 450. The expansion device 460 may be on the supply conduit 470. The expansion device 460 is configured to change the pressure and temperature of the refrigerant flowing therethrough. The expansion device may be a thermal expansion valve (TXV) with an electronically controllable shut-off feature.

The shut-off feature is controlled by the controller 420. The controller 420 may instruct the shut-off feature to position the expansion device in a wide-open position, a fully closed position, or a throttled position. The throttled position is a partially open position where the controller modulates the size of the valve opening to regulate flow through the expansion device. The controller 420 and expansion device 460 may be configured to continuously or periodically modulate the throttled position in response to system operating conditions. By changing the opening within the expansion device, the controller can regulate flow, pressure, temperature, and state of the refrigerant as needed. A return conduit 490 connects the battery chiller 450 to the passenger cabin refrigerant loop 230. The return conduit 490 is connected to the refrigerant-outlet side 500 of the chiller 450 at one end and is connect with conduit 350 at the other.

The battery coolant subsystem 220 places the battery pack 120 and the chiller 450 in fluid communication. The battery coolant subsystem 220 includes a pump 510 disposed on a first conduit 520 that connects between the battery pack 120 and a coolant-inlet side 530 of the chiller 450. A second conduit 540 connects between a coolant-outlet side 550 and the battery pack 120. A coolant inlet temperature sensor 560 is disposed on conduit 520 near the inlet side 530. The coolant inlet temperature sensor 560 is configured to output a signal to the controller 420 indicating a temperature of the coolant circulating into the chiller 450. A coolant outlet temperature sensor 570 is disposed on conduit 540 near the outlet side 550. The coolant outlet temperature sensor 570 is configured to output a signal to the controller 420 indicating a temperature of the coolant exiting the chiller 450. A battery pack temperature sensor 580 is provided to allow the controller 420 to determine a battery pack 120 operating temperature.

The battery chiller 450 may have any suitable configuration. For example, the chiller 450 may have a plate-fin, tube-fin, or tube-and-shell configuration that facilitates the transfer of thermal energy without mixing the heat-transfer fluids in the battery coolant subsystem 220 and the passenger cabin refrigerant loop 230.

The chiller 450 is used to transfer air-conditioner cooling via refrigerant to a battery coolant to cool the battery pack 120. However, operation of the chiller 450 may cause an increase in passenger cabin temperature, resulting in passenger discomfort. To avoid this situation, by the presently disclosed system and method priority is given to passenger cabin cooling. However, when excess passenger cabin air-conditioning capacity is available, that excess capacity is diverted to cool the battery pack 120 as needed. At a high level, when the controller 420 determines by temperature sensors 430, 440 that a temperature of one or both evaporators 260, 270 is determined to be within a predetermined lower limit and an upper limit, the controller will cause expansion device 460 to allow refrigerant from the passenger cabin refrigerant loop 210 to enter the chiller 450. Otherwise, the chiller 450 will not operate.

In the situation where the passenger cabin refrigerant loop 230 is operating in a reduced reheat mode with one or both evaporators 260, 270 at or near the predetermined upper limit and the chiller 450 is not operating, operation of the chiller can only occur after application of a predictive method to anticipate a need for battery pack 120 cooling, which is determined by controller 420 determining a battery pack operating temperature via temperature sensor 570. In an embodiment, the controller 420 determines whether a predetermined battery pack 120 threshold temperature has been reached. If that predetermined battery pack 120 threshold temperature has been reached, the controller 420 causes the temperature of one or both evaporators 260, 270 to lower to the predetermined lower limit and holds that temperature for a predetermined time to store excess cooling capacity in the evaporator 260 and/or 270. At that time, the chiller 450 may be operated until the controller 420 determines that one or both evaporators 260, 270 have reached the predetermined upper temperature limit. During this process, the vehicle air conditioning system blend door (not shown) functions normally to maintain a steady register discharge air temperature, preventing the vehicle occupant(s) from experiencing any temperature swing.

In more detail, FIG. 3 shows a representative control strategy and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein but is provided for ease of illustration and description. The control logic may be implemented primarily in software executed by a microprocessor-based vehicle, engine, and/or powertrain controller, such as controller 420. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

At step 600 controller 420 determines a battery pack 120 temperature by temperature sensor 580 and further ascertains if the battery pack 120 temperature is greater than or equal to an upper threshold temperature (T_bh). If not, no action is taken. If so, the controller 420 further determines at step 610 if the passenger cabin refrigerant loop 230 (i.e., the vehicle A/C system) is operating and whether the front and/or rear evaporators 260, 270 are operating. If the evaporators 260, 270 are not operating, the controller 420 further determines at step 620 whether the battery pack 120 temperature is at or below a predetermined limit, in one embodiment being 0° C. If so, the system resets back to step 600. If not, at step 630 the controller 420 causes the passenger cabin refrigerant loop 210 to operate in chiller mode only, and further determines that the compressor 240 operates at or below a predetermined maximum pressure, in one embodiment being 2350 kPa.

If one or both of the evaporators 260, 270 are operating, at step 640 the controller 420 determines whether the evaporators are operating between a predetermined upper and lower temperature limit. If not, the system returns to step 600, as no excess cooling capacity is available.

If so, at step 650 the controller 420 causes the expansion device 460 to allow refrigerant from the passenger cabin refrigerant loop 230 to enter the chiller 450, thus diverting excess cooling capacity from the passenger cabin refrigerant loop to the battery coolant subsystem 220 to cool the battery. At step 650a the controller 420 controls the operation of expansion device 460 to control coolant flow rate into the chiller 450 as a function of evaporator 260 and/or 270 upper temperature limit, i.e., as one or both evaporators 260, 270 approach the predetermined upper temperature limit, coolant flow rate into the chiller 450 is reduced or terminated.

At step 650b, the controller 420 determines that the compressor 240 operates at or below a predetermined maximum pressure, in one embodiment being 2350 kPa. The controller 420 further ensures that the maximum heat transfer from the battery pack 120 to the chiller 450 is kept below a maximum chiller heat transfer to reduce any impact to passenger cabin comfort. Since any A/C cooling capacity transfer to the battery pack 120 via the chiller 450 will have an impact on cabin temperature, maximum chiller capacity will be an allowable cabin temperature rise (or cabin air temperature degradation) as the result of cooling transfer to the battery pack. Within the above-described constrictions, coolant flow rate into the chiller 450 controls the chiller capacity, i.e. the heat transfer from the battery pack 120 while maintaining passenger cabin comfort levels, thus meeting customer needs and ensuring customer satisfaction.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A battery thermal management system, comprising:
   a passenger cabin air-conditioning refrigerant loop comprising at least one evaporator in fluid communication with a chiller;
   a battery pack coolant loop in fluid communication with the chiller; and
   a controller configured to determine whether a battery pack temperature has reached or exceeded a predetermined upper limit, whether the at least one evaporator is operating, and whether a temperature of the at least one evaporator falls within a predetermined temperature range, and only when the above conditions have been met to cause a valve to bypass a refrigerant from the air-conditioning refrigerant loop to the chiller.

2. The battery thermal management system of claim 1, wherein the valve is a thermal expansion valve (TXV) which controls introduction of the refrigerant into the chiller.

3. An electric vehicle including the battery thermal management system of claim 1.

4. The battery thermal management system of claim 1, further including at least one evaporator temperature sensor.

5. The battery thermal management system of claim 2, further including at least one battery pack temperature sensor.

6. The battery thermal management system of claim 1, wherein the passenger cabin air-conditioning refrigerant loop further comprises a compressor.

7. The battery thermal management system of claim 6, wherein the controller is further configured to prevent the compressor from operating above a predetermined maximum operating pressure.

8. In an electric vehicle, a method for battery pack thermal management, comprising:
   configuring a controller to determine whether a temperature of at least one evaporator of a passenger cabin air-conditioning refrigerant loop falls within a predetermined temperature range and whether a battery pack temperature has exceeded a predetermined upper limit; and
   configuring the controller to, only when the above conditions are met, cause a valve to introduce a refrigerant from the passenger cabin air-conditioning refrigerant loop into a chiller in fluid communication with both the passenger cabin air-conditioning refrigerant loop and a battery pack coolant loop to transfer excess cooling capacity from the passenger cabin air-conditioning refrigerant loop to the battery pack coolant loop.

9. The method of claim 8, including providing a thermal expansion valve (TXV) to control introduction of the refrigerant into the chiller.

10. The method of claim 8, including determining a temperature of the at least one evaporator by at least one evaporator temperature sensor.

11. The method of claim 10, including determining the battery pack temperature by at least one battery pack temperature sensor.

12. The method of claim 8, further including providing the passenger cabin air-conditioning refrigerant loop with a compressor.

13. The method of claim 12, further including configuring the controller to prevent the compressor from operating above a predetermined maximum operating pressure.

14. A battery thermal management system, comprising:
   a passenger cabin air-conditioning refrigerant loop comprising at least one evaporator in fluid communication with a chiller;
   a battery pack coolant loop in fluid communication with the chiller; and
   a controller configured to determine whether a temperature of the at least one evaporator falls within a predetermined temperature range and whether a battery pack temperature has reached or exceeded a predetermined upper limit, and, only when both conditions are met, on request to cause a valve to introduce a refrigerant from the air-conditioning refrigerant loop into the chiller to transfer excess cooling capacity from the passenger cabin air-conditioning refrigerant loop to the battery pack coolant loop.

15. The battery thermal management system of claim 14, further including at least one evaporator temperature sensor.

16. The battery thermal management system of claim 14, wherein the valve is a thermal expansion valve (TXV) which controls introduction of the refrigerant into the chiller.

17. The battery thermal management system of claim 14, further including at least one battery pack temperature sensor.

* * * * *